United States Patent
Zhou et al.

(10) Patent No.: US 9,660,914 B1
(45) Date of Patent: May 23, 2017

(54) SYSTEM AND METHOD FOR PROVIDING CONGESTION NOTIFICATION IN LAYER 3 NETWORKS

(71) Applicant: Google Inc., Mountain View, CA (US)

(72) Inventors: Junlan Zhou, Sunnyvale, CA (US); Zhengrong Ji, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 64 days.

(21) Appl. No.: 14/676,068

(22) Filed: Apr. 1, 2015

Related U.S. Application Data (60) Provisional application No. 61/990,401, filed on May 8, 2014.

(51) Int. Cl.
*H04L 1/00* (2006.01)
*H04L 12/26* (2006.01)
*H04L 12/28* (2006.01)
*H04L 12/801* (2013.01)
*H04L 12/723* (2013.01)

(52) U.S. Cl.
CPC ............ *H04L 47/12* (2013.01); *H04L 43/062* (2013.01); *H04L 45/50* (2013.01); *H04L 47/11* (2013.01)

(58) Field of Classification Search
CPC ......... H04L 47/10; H04L 47/11; H04L 47/12; H04L 47/2483; H04L 47/25; H04L 47/30; H04L 47/26; H04L 47/263
See application file for complete search history.

(56) References Cited

U.S. PATENT DOCUMENTS

| | | |
|---|---|---|
| 6,188,671 B1 | 2/2001 | Chase et al. |
| 7,730,201 B1 | 6/2010 | McAllister et al. |
| 8,077,606 B1 * | 12/2011 | Litwack .............. H04L 43/0882 370/229 |
| 8,160,063 B2 | 4/2012 | Maltz et al. |
| 2009/0303880 A1 | 12/2009 | Maltz et al. |
| 2011/0273983 A1 | 11/2011 | Bergamasco et al. |
| 2012/0051216 A1 * | 3/2012 | Zhang ..................... H04L 47/12 370/230 |

(Continued)

FOREIGN PATENT DOCUMENTS

WO 2010138937 A2 12/2010

OTHER PUBLICATIONS

Daniel et al. (Datacenter Applications in virtualized Networks: A cross layer performance study, Jan. 2014, IEEE, p. 77-87).*

(Continued)

*Primary Examiner* — Maharishi Khirodhar
(74) *Attorney, Agent, or Firm* — Lerner, David, Littenberg, Krumholz & Mentlik, LLP (57) ABSTRACT

A system and method is provided for sending congestion notification messages through L3 networks and implementation of QCN in L3 switches. For example, according to this system and method, an L3 switch receives one or more data packets, and determines, based on the received one or more data packets, whether the L3 switch is congested. If the L3 switch is congested, it generates a congestion notification message, the congestion notification message including an Internet Protocol (IP) header, the IP header identifying a source of the one or more received data packets as its destination. The L3 switch sends the congestion notification message to the source of the one or more received data packets using information in the IP header.

20 Claims, 10 Drawing Sheets

(56) References Cited

U.S. PATENT DOCUMENTS

2013/0124753 A1    5/2013  Ansari et al.
2013/0315065 A1*  11/2013  Matsuike ............... H04L 47/33
                                                       370/236
2014/0098672 A1*   4/2014  Zhang .................... H04L 47/12
                                                       370/236
2014/0310362 A1*  10/2014  Babu ..................... H04L 47/33
                                                       709/206
2015/0195209 A1*   7/2015  Bottorff ................ H04L 47/263
                                                       370/230

OTHER PUBLICATIONS

Broadcom (B. Briscoe, Transport Area Working Group, Mar. 3, 2014, guidlines for adding congestion notification to protocols that encapsulate IP).*

Ramakrishnan ( Sep. 2001, Network working group, The addition of explicit congestion notification (ECN) to IP).*

Crisan et al., Datacenter Applications in Virtualized Networks: A Cross-layer Performance Study, manuscript received Jan. 15, 2013.

* cited by examiner

| sampled packet outer MPLS label or dst_ip | CNM message MPLS or IP header fields |
|---|---|
| dst_ip=1.1.1.0 | dip=2.0.0.0, sip=10.0.0.0, new_ttl=255, new_tos=8 |
| mpls_label=10 | mpls_label=20 |
| ... | |

SYSTEM AND METHOD FOR PROVIDING CONGESTION NOTIFICATION IN LAYER 3 NETWORKS

CROSS-REFERENCE TO RELATED APPLICATIONS

The present application claims the benefit of priority to U.S. Prov. Pat. App. Ser. No. 61/990,401, filed May 8, 2014, titled "SYSTEM AND METHOD FOR PROVIDING CONGESTION NOTIFICATION IN LAYER 3 NETWORKS," the disclosures of which are incorporated by reference in their entirety herein.

BACKGROUND

Quantized Congestion Notification (QCN) is a relatively new congestion management mechanism proposed for Ethernet. It allows switches to generate early congestion feedbacks to the traffic sources, which can then adapt their transmission rates to mitigate congestion and high latency. However, adoption of QCN in Layer 3 networks has been prohibited by challenges such as lack of support for tunneling, complexity, and high cost.

SUMMARY

A system and method is provided for sending congestion notification messages through L3 networks and implementation of QCN in L3 switches.

One aspect of the technology provides a method, comprising receiving, with one or more processors associated with a layer 3 (L3) switch, one or more data packets and determining, with the one or more processors based on the received one or more data packets, whether the L3 switch is congested. If it is determined that the L3 switch is congested, the method further comprises generating, with the one or more processors, a congestion notification message including an Internet Protocol (IP) header, the IP header identifying a source of the one or more received data packets as its destination, and sending, with the one or more processors, the congestion notification message to the source of the one or more received data packets using information in the IP header.

According to one example, the sending may comprise forwarding the congestion notification message to a port on the L3 switch through which the one or more received data packets was received. In another example, generating the congestion notification message comprises encapsulating the congestion notification message with a tunnel header. The one or more received packets may include a data inner IP header, and the IP header of the congestion notification message identifies as its destination a source of the data inner IP header of the received packets. The congestion notification message may be sent to an intermediate switch using the tunnel header, wherein the intermediate switch decapsulates the congestion notification message and forwards the decapsulated message to the source of the received packets.

In some examples, the method may further include determining, with the one or more processors, whether the one or more received packets are eligible for congestion notification. Such determining may include determining whether the one or more received packets include at least one of a data IP header or a multiprotocol label switching (MPLS) header. If the one or more received packets include a data IP header, the determining whether the one or more received packets are eligible for congestion notification may further comprise determining whether the one or more received packets has a quantized congestion notification IP option.

Another aspect of the disclosure provides a layer 3 switch, comprising at least one memory storing data and executable instructions, and one or more processors in communication with the at least one memory. The one or more processors are configured to receive one or more data packets, determine, based on the received one or more data packets, whether the L3 switch is congested, generate a congestion notification message if it is determined that the L3 switch is congested, the congestion notification message including an Internet Protocol (IP) header, the IP header identifying a source of the one or more received data packets as its destination, and send the congestion notification message to the source of the one or more received data packets using information in the IP header.

Yet another aspect of the disclosure provides a non-transitory computer-readable medium storing instructions executable by one or more processors for performing a method. Such method comprises receiving one or more data packets transmitted through an L3 network, determining, based on the received one or more data packets, whether a given L3 switch in the network is congested, generating a congestion notification message if it is determined that the given L3 switch is congested, the congestion notification message including an Internet Protocol (IP) header, the IP header identifying a source of the one or more received data packets as its destination, and sending the congestion notification message to the source of the one or more received data packets using information in the IP header.

DETAILED DESCRIPTION

This disclosure provides for extending QCN to layer (L3) internet protocol (IP) networks, and implementation of QCN in L3 switches. A congestion notification message (CNM) is designed to include an IP header in addition to a CNM payload, such as a CNM payload used for layer 2 QCN. This design may vary based on whether the network is non-tunneled or tunneled, such as a Multiprotocol Label Switching (MPLS) network.

For non-tunneled networks, the IP header may include a source IP address, a destination UP address, an IP protocol number, and an IP option. The source IP address of the L3 CNM is the IP address of the router. The destination IP address of the CNM is the destination IP address of a sampled packet frame from an offending traffic source (e.g., the switch or host causing the congestion). The IP option further includes, for example, the following fields: a 1 bit copied field set to 1 (to indicate that the option field is to be copied to all fragments of IP packet), a 2 bit option class field set to 0 (indicating the control category), a 5 bit option number field, an 8 bit option length field, and an 8 bit option data field set to the identifier of the node generating the IP packet being sampled.

When a tunneled packet is sampled by the switch, the CNM triggered may have a different format. For example, a CNM triggered by an ip-in-ip packet may vary from the non-tunneled network CNM in that it is encapsulated with an outer IP header. Moreover, a destination IP of the inner IP header is set to the source IP of the inner IP header of the sampled packet. Collectively, the outer and inner IP headers allow the CNM to be reverse path forwarded from the congested router and the traffic source. Such reverse path may include core and edge routers in a tunneled network. The core routers forward the CNM based on its outer IP header. The edge router decapsulates the outer IP header of the CNM and forwards the CNM based on its inner IP header.

Figure 1:
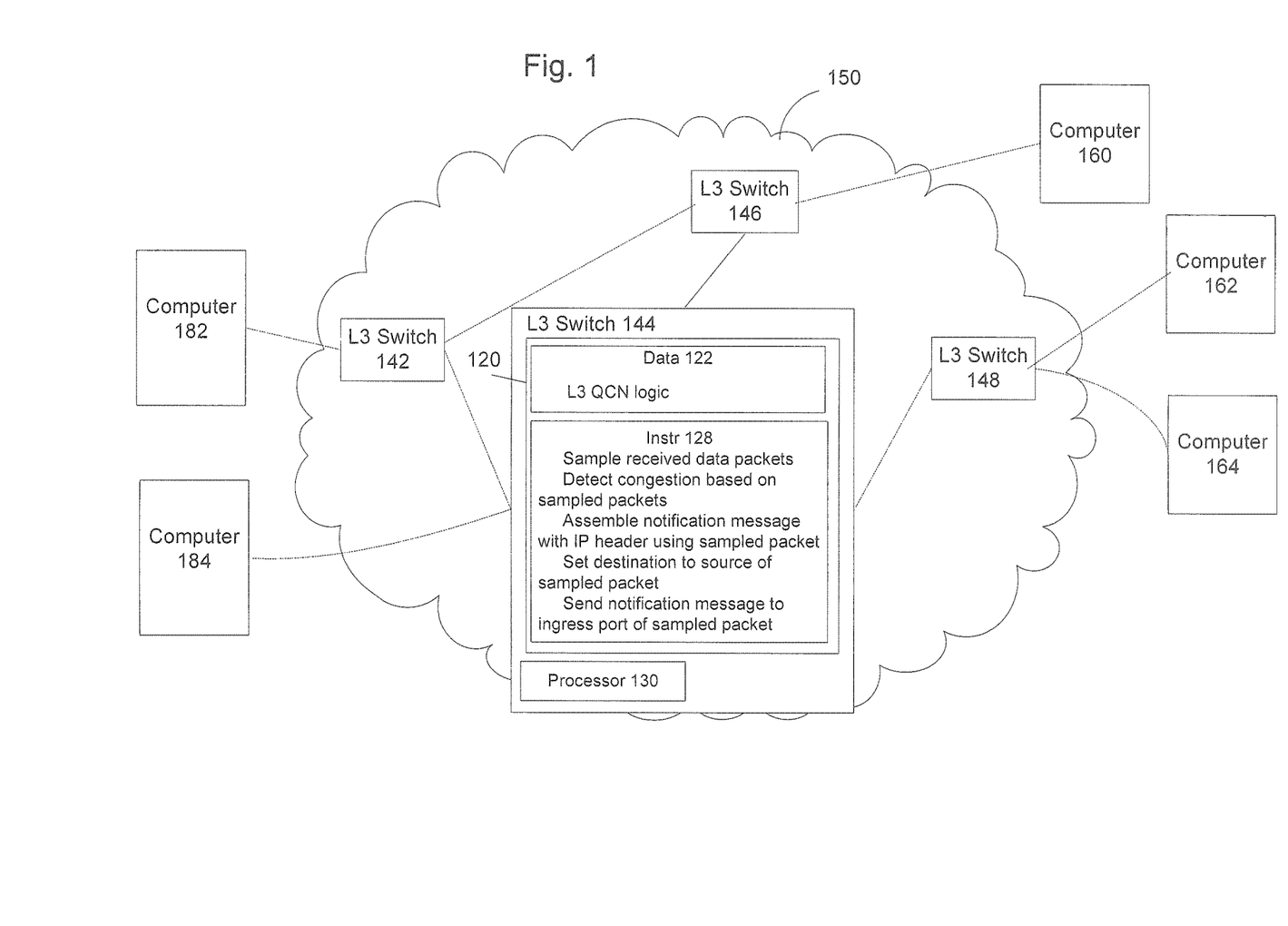
FIG. 1 is a system diagram according to an aspect of the disclosure.

FIG. 1 illustrates an example network 150 that joins a plurality of computers 160, 162, 164, 182, 184. The network 150 may be, for example, a datacenter or any other collection of routers or other switching devices joining two or more host devices. The network 150 includes a plurality of layer 3 (L3) switches 142, 144, 146, 148. Each L3 switch may include a processor 130 and a memory 120 coupled to the processor 130. Each L3 switch 142-148 may further include one or more input ports for receiving data, such as packets or program updates, from other L3 switches or computing devices. Similarly, each L3 switch 142-148 may have one or more output ports for transmitting data through the network 150.

Each router may have a processor and a memory, such as memory 120 of the router 144, which stores data 122 and instructions 128, for example, for detecting congestion and notifying an offending traffic source of the congestion. For example, the L3 switch 144 samples received data packets and detects congestion based on the sampled packets. If congestion is detected, the L3 switch 144 assembles a notification message with an Internet Protocol (IP) header using the sampled packet. Example notification messages are described in further detail below with respect to FIGS. 2-4 and 6. The destination of the notification message is set to the source of the sampled packet, and the notification message is sent to an ingress port of the L3 switch 144 through which the sampled packet was received. Accordingly, for example, if the computer 182 is the offending traffic source, the notification message is forwarded to the computer 182 through the L3 switch 142. In response, the computer 182 may reduce its packet transmission rate.

The memory 120 stores information accessible by processor 130, including instructions 128, and data 122 that may be executed or otherwise used by the processor 130. The memory 120 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 128 may be any set of instructions to be executed directly (such as machine code) or indirectly (such as scripts) by the processor 130. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 122 may be retrieved, stored or modified by processor 130 in accordance with the instructions 128. For instance, although the system and method is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The processor 130 may be any conventional processor, such as processors in commercially available routers. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

The computers 160, 162, 164, 182, 184 may be any of a variety of computing devices, including servers in a datacenter, personal digital assistants (PDAs), laptops, tablet PCs, netbooks, PCs, etc. These devices may be connected to the network 150 via a wired connection, such as through a modem, or wirelessly, such as through an access point in communication with one of the routers 142-148. Although only a few computers are depicted in FIG. 1, it should be appreciated that the system can include a large number of connected computers, with each different computer being at a different node of the network 150. The network, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by any device capable of transmitting data to and from other computers, such as modems (e.g., dial-up, cable or fiber optic) and wireless interfaces.

According to aspects of the disclosure, the L3 switch 144 determines whether received data packets are eligible for QCN. If so, the L3 switch 144 samples a QCN enabled queue of packets and determines, based on the sampling, whether it is becoming congested. For example, the L3 switch 144 may determine that more packets are being received from the computer 182 than the switch 144 can handle within a predetermined amount of time. Accordingly, the L3 switch 144 generates a congestion notification message (CNM) and sends the CNM to the computer 182 through the switch 142.

Figure 2:
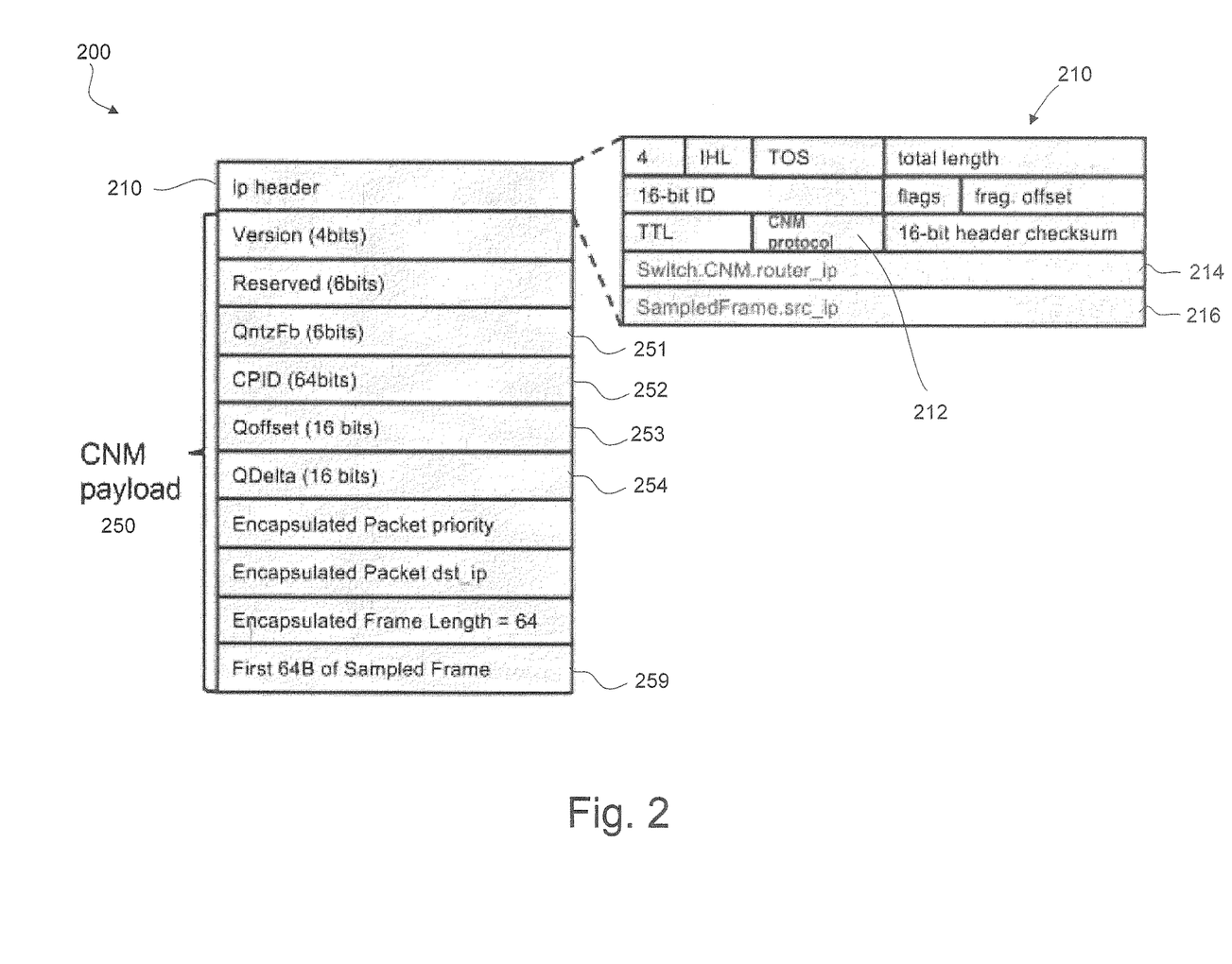
FIG. 2 illustrates an example L3 congestion notification message format according to aspects of the disclosure.

FIG. 2 illustrates an example congestion notification message 200 for L3 networks. The example format of the message 200 may work particularly well for all non-tunneled IP traffic being sampled. The message 200 includes an IP header 210, as well as a payload 250. The payload, similar to layer 2 QCN format, includes a QntzFb field 251, Congestion Point ID (CPID) field 252, Qoffset field 253, and Qdelta field 254. The payload 250 also includes a truncated frame 259 of the sampled packet that triggered the notification message.

The IP header 210 includes source address field 214 and destination address field 216. The source IP address of the notification message 200 is set to the router IP of the switch generating the message. For example, referring back to FIG. 1, if the L3 switch 144 generates the notification message, the source IP in field 214 is set to the IP address of the switch 144. The destination IP 216 is set to match the destination IP of the sampled packet frame. A new IP protocol number is assigned to all notification messages. The new IP protocol number appears in field 212.

Figure 3:
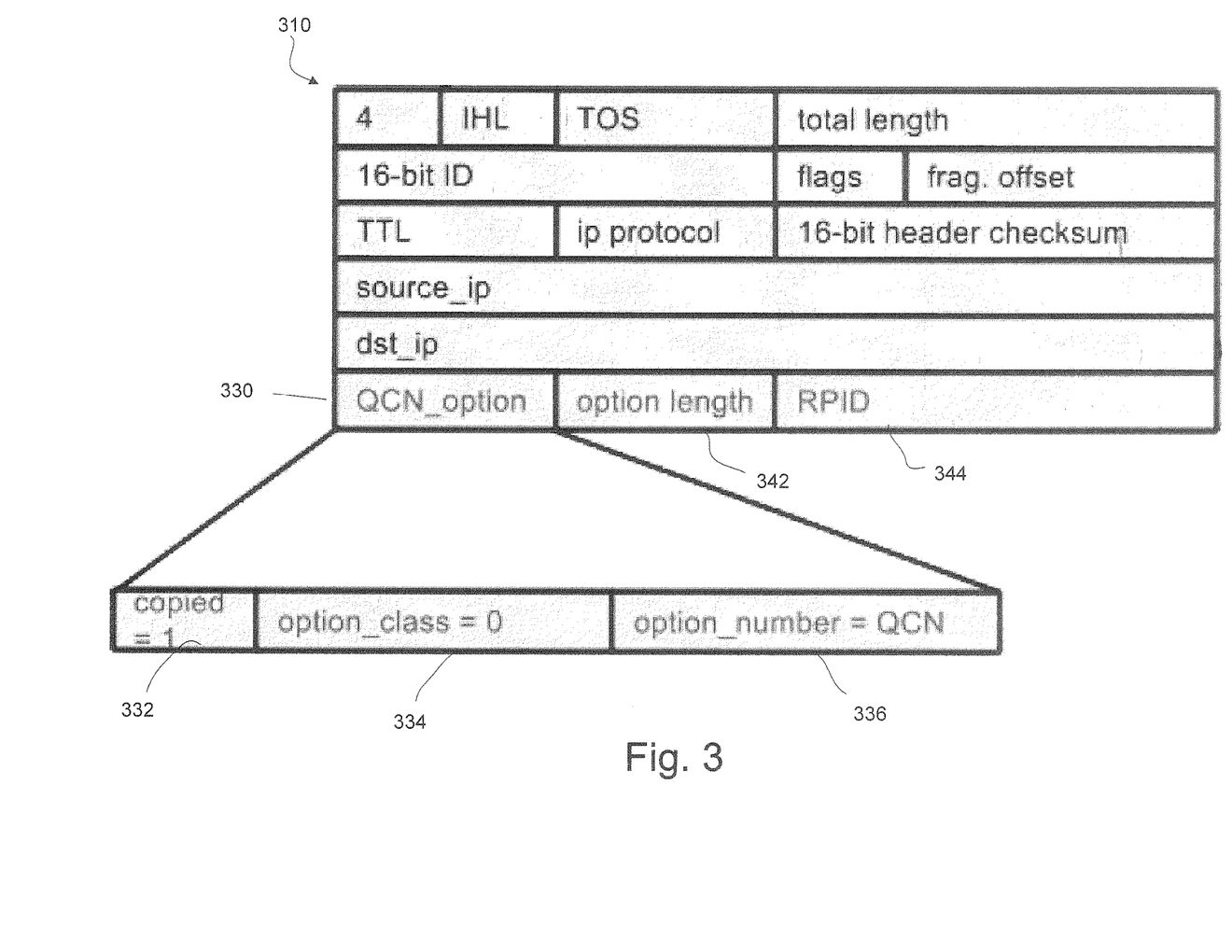
FIG. 3 is an example of a header for the L3 congestion notification message of FIG. 2.

FIG. 3 illustrates another example of the IP header for the congestion notification message discussed above. In this example, a new IP option number 330 is also allocated for L3 QCN. For example, all QCN enabled IP packets may carry an IP option identified by this number. The IP option 330 in the header may include following fields: a 1 bit copied field 332, a 2 bit option class field 334, and a 5 bit option number field 336. The copied field 332 is set to 1 to indicate that the option field is to be copied to all fragments of IP packet. The option class field 334 is set to 0, indicating a control category. The control category may indicate, for example, whether the packet is a network control packet. For example, a control packet carries control information needed for the network protocols to run on switches, as opposed to carrying regular data (received by machines). The option number field 336 is set to the IP option number for L3 QCN. The IP header in this example also includes an 8 bit option length field 342 and an 8 bit option data field 344. The option data field 344 is set to an ID of the traffic source or "Reaction Point" generating the IP packet being sampled. These additional fields 330, 342, 344 in the IP header 310 inform L3 switches receiving the notification message including the header that those switches are eligible for QCN. While the various fields in the IP header are described as having a particular size, such as 2 bits or 8 bits, it should be understood that the size of each field may be varied. Moreover, it should be understood that additional fields may be included or that fields may be condensed or omitted.

Figure 4:
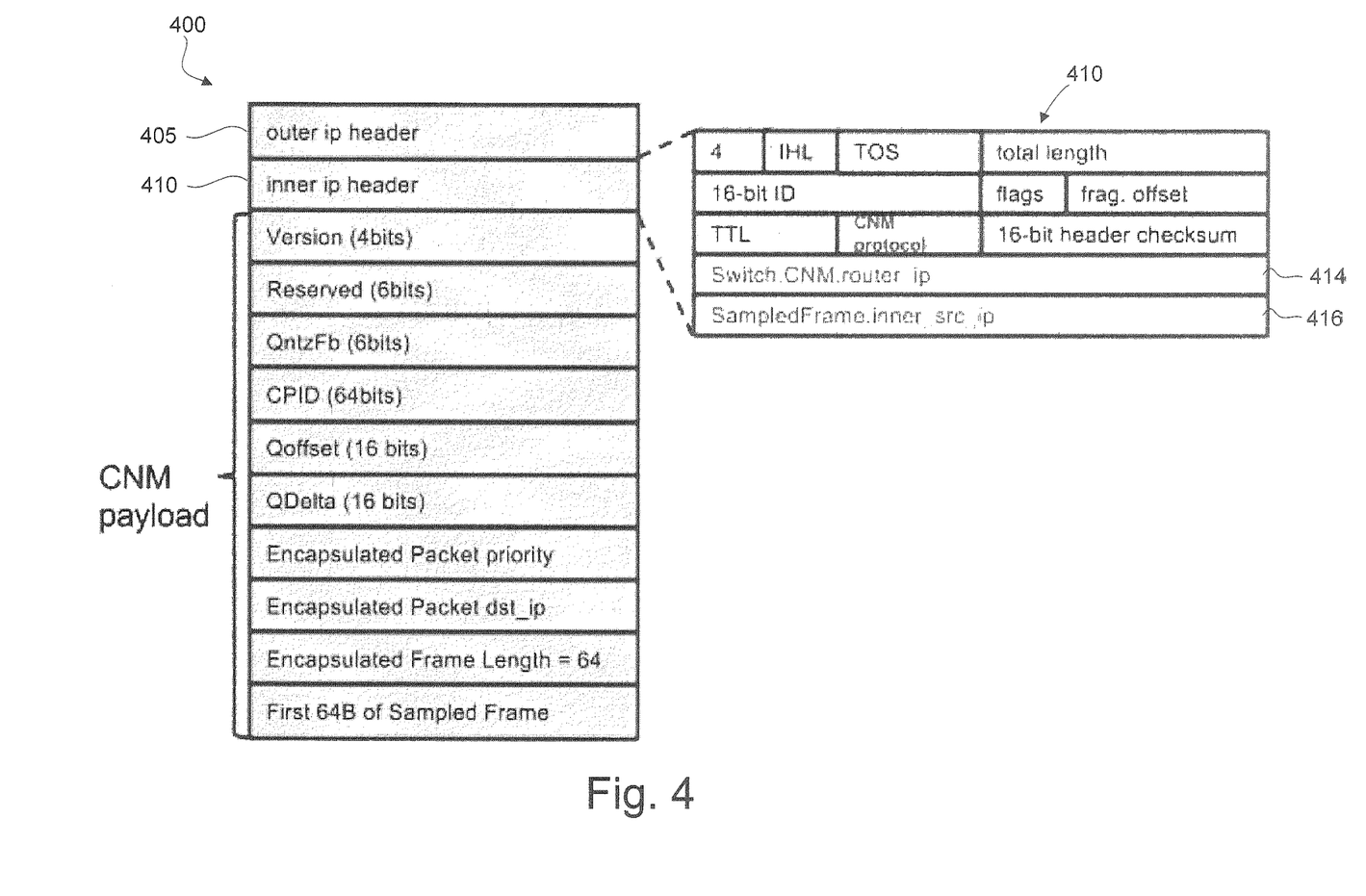
FIG. 4 illustrates another example L3 congestion notification message format according to aspects of the disclosure.

FIG. 4 illustrates another example congestion notification message 400. The example format shown here may be used for ip-in-ip packets, where a tunneled packet is sampled by an L3 switch. In this example, the notification message is encapsulated with an outer IP header 405, which is used to forward the CNM to the traffic source. The outer IP header may be a regular IP header, including source IP, destination IP, etc. The outer IP header of QCN packet may be derived from the data packet causing congestion and thus triggers QCN packet to be generated.

Inner IP header 410 includes destination address field 416, which is set to a source IP address of the inner IP header 410 of the sampled packet. Similar to the example message 200 of FIG. 2, source address field 414 is set to the router IP of the switch generating the message. Collectively, the outer IP header 405 and the inner IP header 410 enable reverse-path forwarding of the congestion notification message 400 from the congested L3 router that generates the message to the offending traffic source.

In a tunneled network, a reverse path traveled by the notification message 400 may include both core and edge routers. The core routers forward the notification message 400 based on the outer IP header 405. The edge router decapsulates the outer IP header 405 and forwards the message 400 based on the inner IP header 410.

Figure 5:
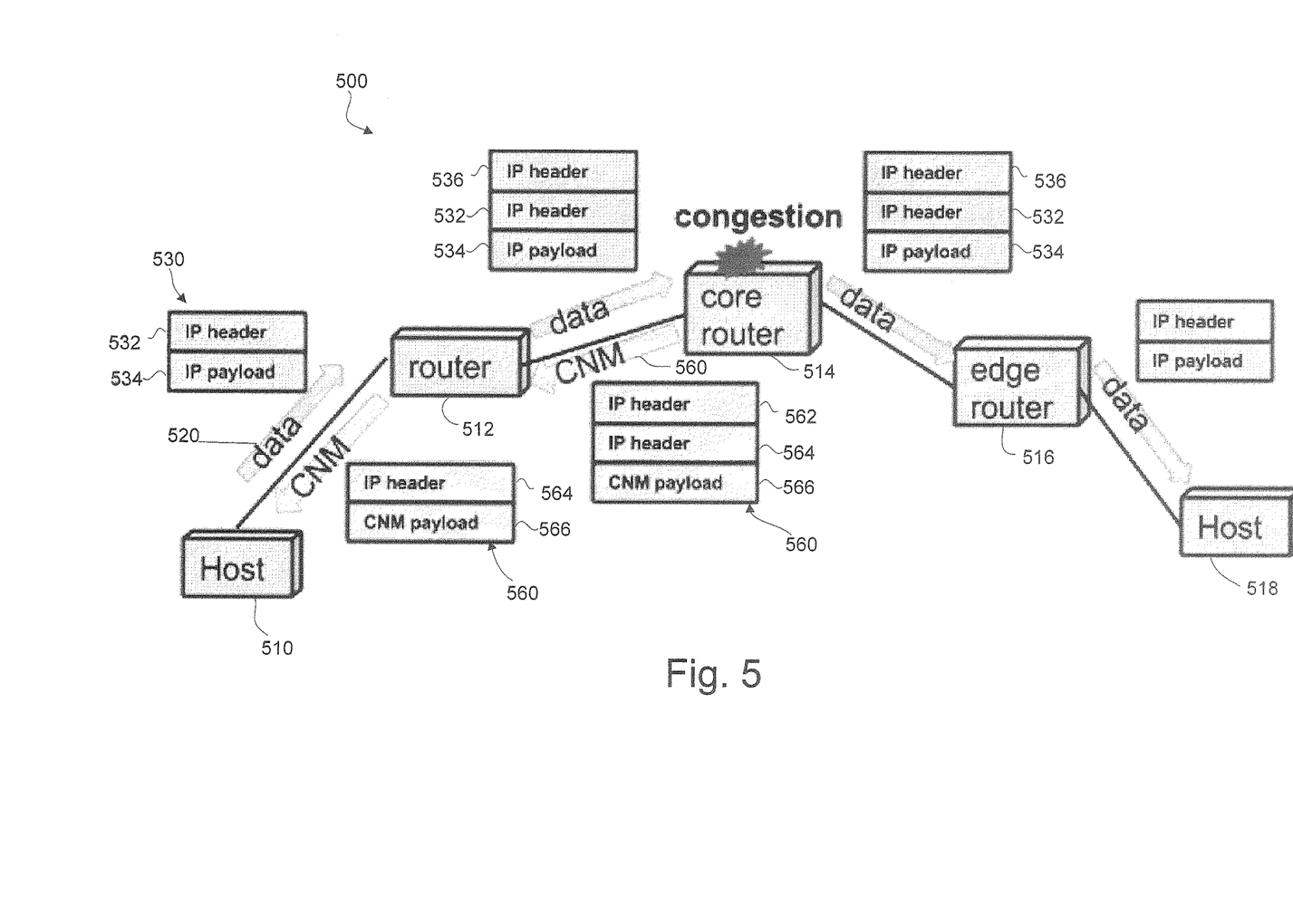
FIG. 5 illustrates an example message flow in a tunneled L3 network according to aspects of the disclosure.

FIG. 5 illustrates an example of routing traffic in a tunneled network 500. In this example, a core router detects congestion caused by IP data packets. Accordingly, a congestion notification message for a sampled ip-in-ip packet is transmitted through the tunneled network 500.

Host 510 transmits data to host 518 through router 512, core router 514, and edge router 516. Data 520 transmitted from the host 510 to the router 512 includes a data packet 530. The packet 530 includes an IP header 532 and an IP payload. As the data packet 530 is forwarded from the router 512 to the core router 514, the router 512 attaches a second IP header 536. As the data packet is further passed to the edge router 516 and to the host 518, the edge router 516 removes the second IP header 536.

As the data 520 is being transmitted through the network 500, one or more of the routers 512-516 samples the packets 530 and detects congestion based on the sampling. For example, as shown in FIG. 5, the core router 514 detects that it is becoming congested. Accordingly, the core router 514 generates a congestion notification message (CNM) 560. The CNM 560 includes a CNM payload 566, an inner IP header 564, and an outer IP header 562, as described above with respect to FIG. 4. The outer IP header 562 is used to deliver the packet 560 to the router 512. The router 512 receives the packet 560 and decapsulates it, removing the outer IP header 562. The router 512 then forwards the decapsulated packet 560 to the host 510 using the inner IP header 564. The host 510, in response to receiving the CNM 560, may modify its data transmission, such as by modifying a transmission rate or modifying a route through which the data is transmitted.

Figure 6:
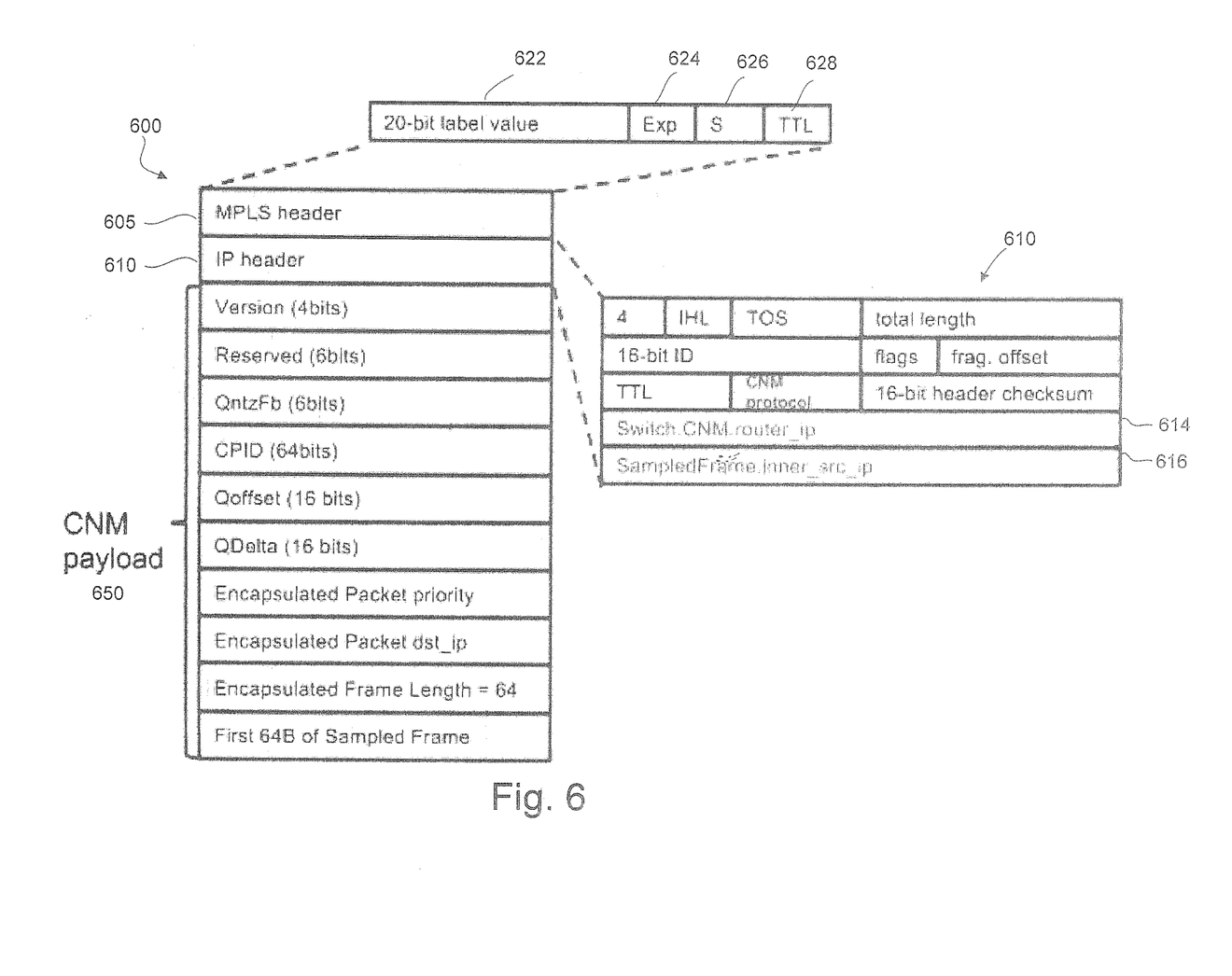
FIG. 6 illustrates another example L3 congestion notification message format according to aspects of the disclosure.

FIG. 6 illustrates another example congestion notification message 600. The format of the CNM 600 may be particularly suited for Multiprotocol Label Switching (MPLS) networks. The CNM 600 includes an IP header 610 and a CNM payload 650, similar to the inner IP header 410 and payload of the ip-in-ip CNM 400 of FIG. 4.

The MPLS header 605 includes a label ID in field 622. The label ID identifies a return path from the switch generating the CNM 600 to a source of the sampled ip-in-MPLS packet. The MPLS header 605 may further include bits for experimental (Exp), bottom of stack (S), time to live (TTL), etc.

The IP header 610 includes source address field 614 and destination address field 616. The destination IP field 616 is set to the source IP address of the sampled ip-in-MPLS packet.

Figure 7:
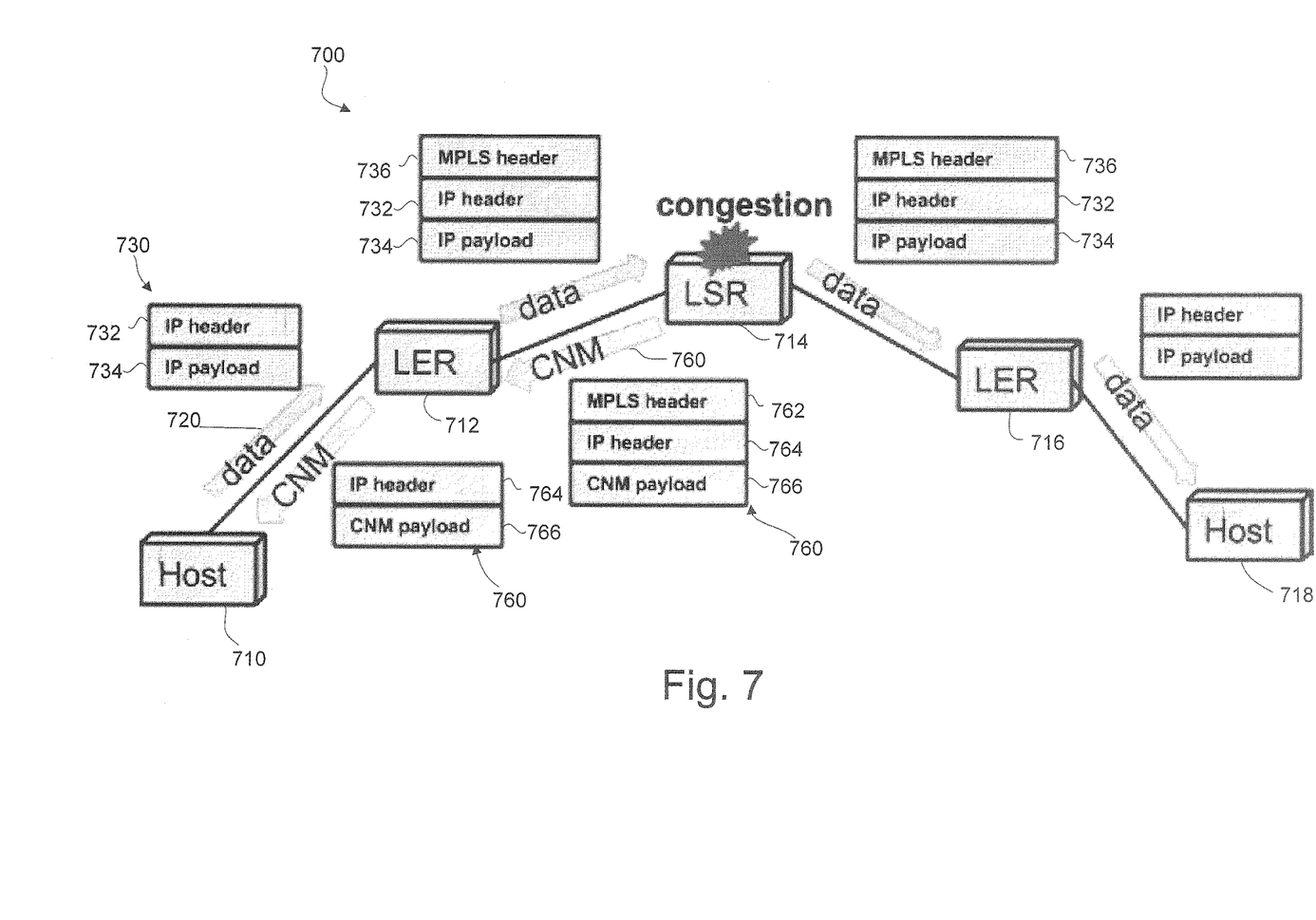
FIG. 7 illustrates another example message flow in a tunneled L3 network according to aspects of the disclosure.

FIG. 7 illustrates an example of routing traffic in an MPLS network 700. Host 710 transmits data to host 718 through label edge router (LER) 712, label switch router (LSR) 714, and LER 716. Data 720 transmitted from the host 710 to the LER 712 includes a packet 730. The packet 730 includes an IP header 732 and an IP payload. As the packet 730 is forwarded from the LER 712 to the LSR 714, the LER 712 attaches an MPLS header 736. As the packet is further passed to the LER 716 and to the host 718, the LER 716 removes the MPLS header 736.

As the data 720 is being transmitted through the network 700, one or more of the routers 712-716 samples the packets 730 and detects congestion based on the sampling. For example, as shown in FIG. 7, the LSR 714 detects that it is becoming congested. Accordingly, the LSR 714 generates a CNM 760. The CNM 760 includes a CNM payload 766, an inner IP header 764, and an MPLS header 762, as described above with respect to FIG. 6. The MPLS header 762 is used by the LSR 714 to label switch the CNM 760 to the LER 712. The LER 712 receives the packet 760 and pops the MPLS header 762. The LER 712 then forwards the decapsulated CNM 760 to the host 710 based on the inner IP header 764, which carries the source IP of the sampled ip-in-MPLS packet as the destination IP. The host 710, in response to receiving the CNM 760, may modify its data transmission, such as by modifying a transmission rate or modifying a route through which the data is transmitted.

To enable L3 QCN, and to perform the example routing operations described above with respect to FIGS. 5 and 7, L3 switches are programmed with L3 QCN capabilities. For example, the L3 switches implement logic for determining if a packet is L3 QCN enabled, and logic for generating/forwarding CNMs for sampled packets.

Figure 8:
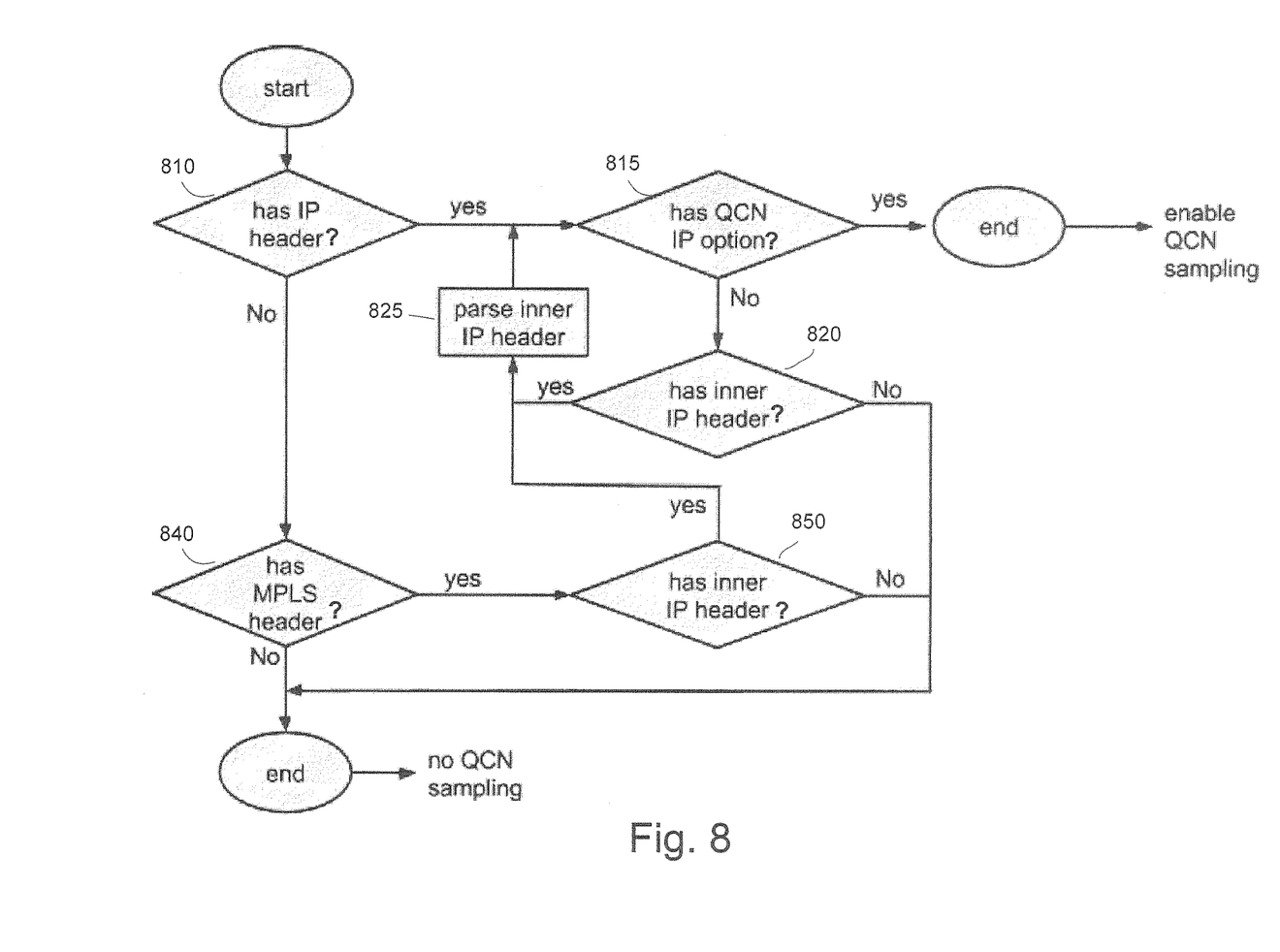
FIG. 8 is a flow diagram illustrating example L3 switch logic according to aspects of the disclosure.

FIG. 8 is a flow diagram illustrating an example of the QCN logic implemented in the L3 switches. This logic may be run by the L3 switches, for example, to parse a packet to be L3 routed and to decide if the packet is QCN enabled. If the packet is QCN enabled, the packet may be included in a queue to detect congestion. Thus, according to one example, the logic may be run each time the switch receives a packet to be forwarded. According to other examples, the logic is run less frequently, such as for every $x^{th}$ packet received, or on a next packet received after a predetermined interval of time.

At block 810, the L3 switch determines whether the packet includes an IP header. For example, the IP header may resemble the IP header 210 of FIG. 2. According to another example, depending on which L3 switch receives the packet, the IP header may be similar to the outer IP header 405 of FIG. 4, the inner IP header 410 of FIG. 4.

If the packet does not include an IP header, the L3 switch determines whether the packet includes an MPLS header (block 840), such as the MPLS header 605 of FIG. 6. If the packet has neither an IP header nor an MPLS header, the L3 switch determines that the packet is not QCN enabled. Accordingly, the L3 switch does not perform QCN sampling.

If the L3 switch determines at block 810 that the packet has an IP header, it is determined at block 815 whether the packet has a QCN IP option. For example, referring to FIG. 3, it may be determined whether the IP header of the packet includes QCN option field 330. If the packet includes a QCN IP option, the L3 switch determines that the packet is QCN enabled, and enables QCN sampling.

If the L3 switch determines at block 815 that the packet does not include a QCN IP option, the L3 switch further determines whether the packet includes an inner IP header, such as the inner IP header 410 of FIG. 4. For example, if the IP header identified in block 810 is an outer IP header, it may not contain a QCN option although the inner IP header for the packet may. Accordingly, if it is determined in block 820 that the packet has an inner IP header, the L3 switch parses the inner IP header (block 825) to determine whether it includes a QCN option.

Similar to block 820, if it is determined in block 840 that the packet includes an MPLS header, it is further determined in block 850 whether the packet also includes an inner IP header. If so, the L3 switch parses the inner IP header (block 825) and determines whether it includes a QCN IP option (block 815).

If none of the headers in the packet include a QCN IP option, the L3 switch determines that the packet is not QCN enabled, and does not perform QCN sampling.

In addition to the foregoing logic for determining whether packets are QCN enabled, the L3 switches may also be programmed with instructions for generating congestion notification messages upon detection of congestion. For example, for non-tunneled IP packets, the L3 switch computes the header fields and payload of the CNM from the IP header fields in the sampled packet and queue statistics maintained by the switch based on IEEE standards. The generated CNM is then forwarded to the port of the L3 switch through which the sampled packet was received. Because the CNM message has the source IP of sampled packet as the destination IP, it will be routed by upstream switches to the congestion source that generated the sampled packet.

For tunneled IP packets, the L3 switches may be programmed with further information. The CNM generated by the congested L3 switch in a tunneled network includes a tunnel header, an inner IP header, and a CNM payload, as discussed above with respect to FIGS. 4 and 6. The label ID or destination IP in the tunnel header must be set appropriately for the CNM to be routed to the congestion source generating the sampled packet. According to one example, the L3 switches may store a congestion notification message encapsulation table for use in appropriately generating the tunnel header.

Figure 9:
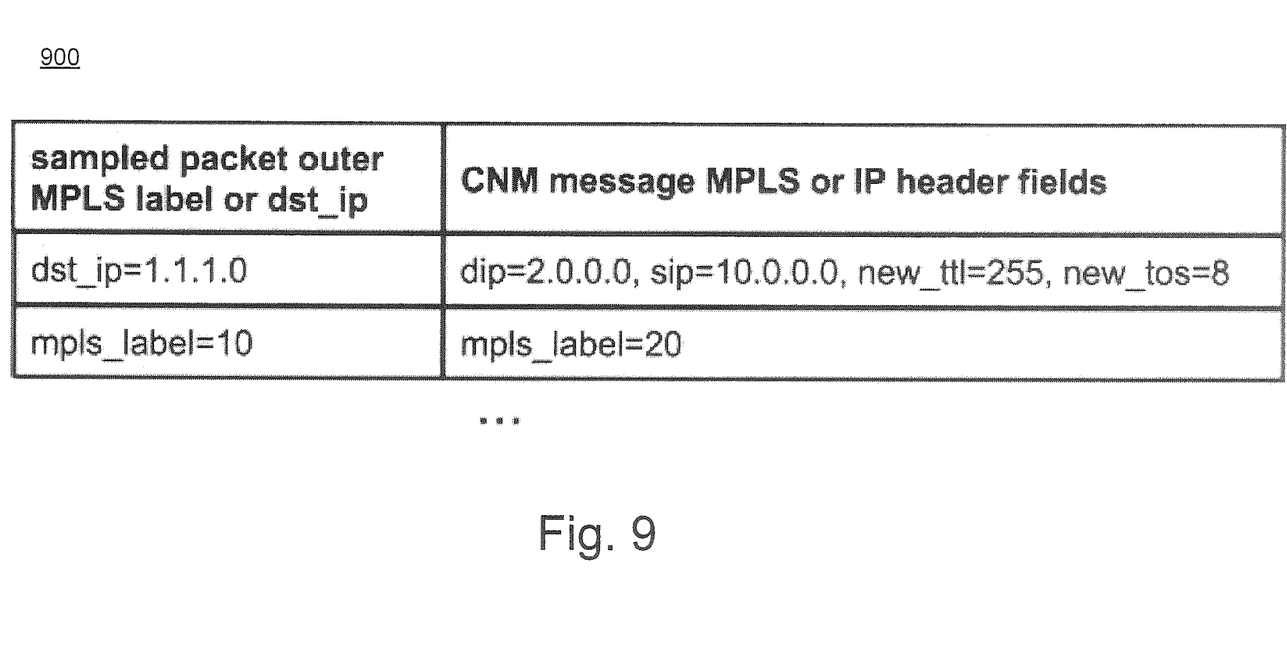
FIG. 9 is an example table implemented in L3 switches in tunneled networks according to aspects of the disclosure.

FIG. 9 illustrates an example CNM encapsulation table 900. The table may be stored in L3 switches to support reverse path forwarding of CNMs in tunneled networks. As shown, the table entries are indexed by the MPLS label or destination IP in the outer MPLS header or IP header of encapsulated IP packets. Corresponding to the MPLS label or destination IP are fields for the CNM tunnel header and values for entry in those fields. The values are used to generate the corresponding MPLS or IP tunnel header of CNM messages. According to one example, the table 900 is to be populated by the routing protocol, based on its computed route from the sampling switch to the traffic source.

Figure 10:
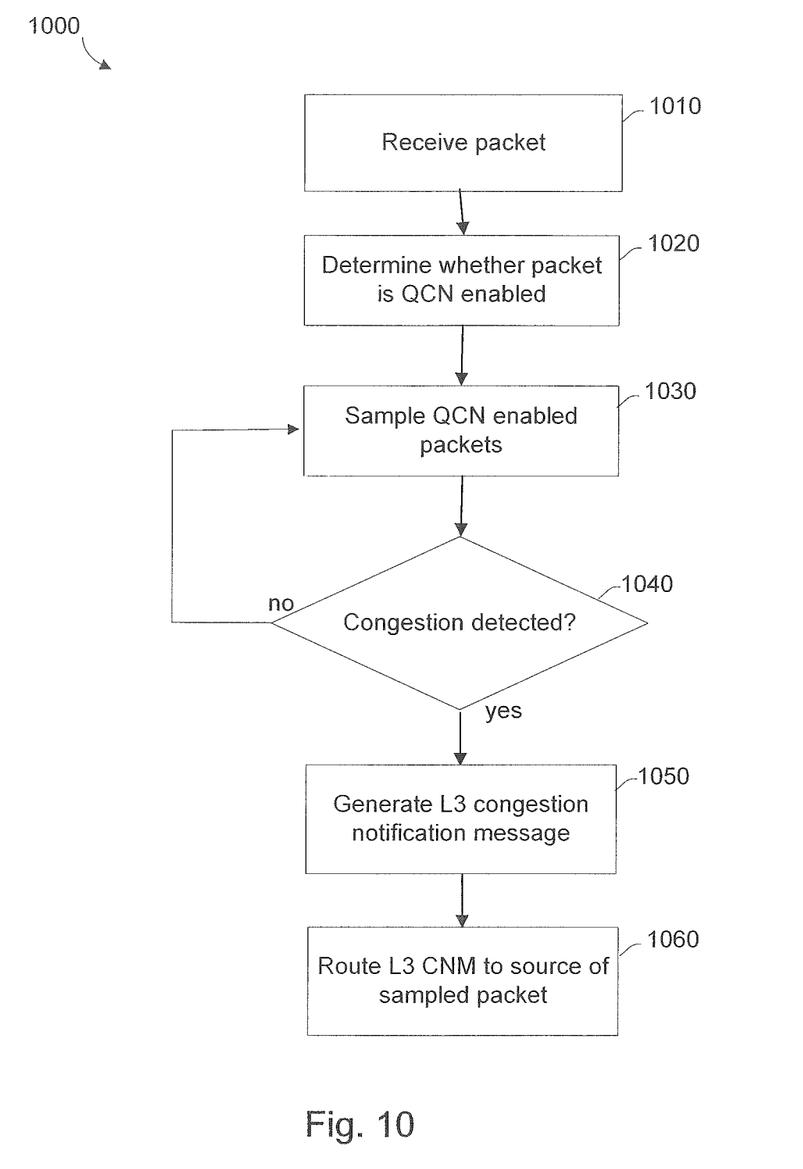
FIG. 10 is a flow diagram of an example method according to aspects of the disclosure.

FIG. 10 illustrates a method 1000 for congestion notification in L3 switches. The method 1000 may be performed by, for example, any L3 switch in the network. The network may be a tunneled network or a non-tunneled network.

In block 1010, the L3 switch receives packets transmitted through the network. The L3 switch determines whether the received packets are QCN enabled (block 1020). For example, the L3 switch may execute the logic discussed with respect to FIG. 8.

For packets that are QCN enabled, the L3 switch samples the packets. For example, the L3 switch may sample a QCN-enabled queue to detect whether the L3 switch is becoming congested.

In block 1040, the L3 switch determines whether congestion has occurred. If no congestion is detected, the switch continues to sample traffic. However, if congestion is detect in block 1040, the switch generates a congestion notification message (block 1050).

As discussed above, the format of the congestion notification message may vary to some degree depending on whether the network is tunneled or non-tunneled. For non-tunneled networks, the switch may add an IP header to a CNM payload. For tunneled networks, the switch may further add a tunnel header, such as an outer IP header or an MPLS header.

In block 1060, the switch sends the CNM to the source of the sampled packet. For example, for non-tunneled networks, the switch sends the CNM to a port through which the sampled packet was received. For tunneled networks, the switch may address the tunnel header using an encapsulation chart, such as described with respect to FIG. 9, and transmit the CNM.

It should be understood that the operations involved in the above methods need not be performed in the precise order described. Rather, various operations may be handled in a different order or simultaneously, and operations may be added or omitted.

The systems, methods, and examples described above are advantageous in that they provide for congestion notification in L3 networks. As such, traffic sources causing congestion may be notified of such congestion and adapt accordingly, such as by changing their transmission rate or routes. Accordingly, a number of packet drops in the network may be reduced significantly. Additionally, a round trip time of data center traffic is also greatly reduced.

As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
receiving, with one or more processors associated with a layer 3 (L3) switch, one or more data packets, the one or more data packets including a quantized congestion notification (QCN) Internet Protocol (IP) option;
determining, with the one or more processors based on the received one or more data packets, that the L3 switch is congested;
generating, with the one or more processors, a congestion notification message when it is determined that the L3 switch is congested, the congestion notification message including an inner IP header, the inner IP header identifying a source of the one or more received data packets as its destination, wherein the congestion notification message is encapsulated with an outer IP header used for sending the congestion notification message to an intermediate switch; and
sending, with the one or more processors, the congestion notification message to the source of the one or more received data packets using information in the inner IP header.

2. The method of claim 1, wherein sending the congestion notification message further comprises forwarding the congestion notification message to a port on the L3 switch through which the one or more received data packets was received.

3. The method of claim 1, wherein the outer IP header is a tunnel header.

4. The method of claim 3, wherein:
the one or more received packets include a data inner IP header; and
the inner IP header of the congestion notification message identifies as its destination a source of the data inner IP header of the received packets.

5. The method of claim 1, wherein the sending the congestion notification message comprises sending it through the intermediate switch, wherein the intermediate switch decapsulates the congestion notification message and forwards the decapsulated message to the source of the received packets.

6. The method of claim 1, further comprising determining, with the one or more processors, that the one or more received packets are eligible for congestion notification.

7. The method of claim 6, wherein determining that the one or more received packets are eligible for congestion notification comprises determining that the one or more received packets include at least one of a data IP header or a multiprotocol label switching (MPLS) header.

8. The method of claim 7, wherein, when the one or more received packets include a data IP header, the determining that the one or more received packets are eligible for congestion notification further comprises determining that the one or more received packets has the QCN IP option.

9. A layer 3 (L3) switch, comprising:
at least one memory storing data and executable instructions; and
one or more processors in communication with the at least one memory, the one or more processors to:
receive one or more data packets, the one or more data packets including a quantized congestion notification (QCN) Internet Protocol (IP) option;
determine, based on the received one or more data packets, that the L3 switch is congested;
generate a congestion notification message when it is determined that the L3 switch is congested, the congestion notification message including an inner IP header, the inner IP header identifying a source of the one or more received data packets as its destination, wherein the congestion notification message is encapsulated with an outer IP header, the outer IP header used for sending the congestion notification message to an intermediate switch; and
send the congestion notification message to the source of the one or more received data packets using information in the inner IP header.

10. The L3 switch of claim 9, wherein the one or more processors are further configured to encapsulate the congestion notification message with a tunnel header.

11. The L3 switch of claim 10, wherein:
the one or more received packets include a data inner IP header; and
the inner IP header of the congestion notification message identifies as its destination a source of the data inner IP header of the received packets.

12. The L3 switch of claim 10, wherein the one or more processor are further configured to send the congestion notification message to an intermediate L3 switch using the tunnel header, the intermediate L3 switch adapted to decapsulate the congestion notification message and forward the decapsulated message to the source of the received packets.

13. The L3 switch of claim 9, wherein the one or more processors are further configured to determine that the one or more received packets are eligible for congestion notification.

14. The L3 switch of claim 13, wherein determining that the one or more received packets are eligible for congestion notification comprises determining that the one or more received packets include at least one of a data IP header or a multiprotocol label switching (MPLS) header.

15. The L3 switch of claim 14, wherein, when the one or more received packets include a data IP header, the determining that the one or more received packets are eligible for congestion notification further comprises determining that the one or more received packets has the QCN IP option.

16. A non-transitory computer-readable medium storing instructions executable by one or more processors for performing a method, the method comprising:
   receive one or more data packets transmitted through an L3 network, the one or more data packets including a quantized congestion notification (QCN) Internet Protocol (IP) option;
   determine, based on the received one or more data packets, that a given L3 switch in the network is congested;
   generate a congestion notification message when it is determined that the given L3 switch is congested, the congestion notification message including an inner IP header, the inner IP header identifying a source of the one or more received data packets as its destination, wherein the congestion notification message is encapsulated with an outer IP header, the outer IP header used for sending the congestion notification message to an intermediate switch; and
   send the congestion notification message to the source of the one or more received data packets using information in the inner IP header.

17. The non-transitory computer-readable medium of claim 16, wherein
   sending the congestion notification message further comprises forwarding the congestion notification message to a port on the given L3 switch through which the one or more received data packets was received.

18. The non-transitory computer-readable medium of claim 16, wherein generating the congestion notification message further comprises encapsulating the congestion notification message with a tunnel header.

19. The non-transitory computer-readable medium of claim 18, wherein:
   the one or more received packets include a data inner IP header; and
   the inner IP header of the congestion notification message identifies as its destination a source of the data inner IP header of the received packets.

20. The non-transitory computer-readable medium of claim 18, the method further comprising sending the congestion notification message to an intermediate L3 switch using the tunnel header, wherein the intermediate L3 switch is adapted to decapsulate the congestion notification message and forward the decapsulated message to the source of the received packets.

* * * * *